(12) United States Patent
Arar et al.

(10) Patent No.: US 8,904,747 B2
(45) Date of Patent: Dec. 9, 2014

(54) GAS TURBINE INLET HEATING SYSTEM

(75) Inventors: Malath Ibrahim Arar, Clifton Park, NY (US); Anna Valeria Anllo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 710 days.

(21) Appl. No.: 13/175,006

(22) Filed: Jul. 1, 2011

(65) Prior Publication Data

US 2013/0000321 A1 Jan. 3, 2013

(51) Int. Cl.
  *F02C 7/047* (2006.01)
  *F02C 6/08* (2006.01)
  *F02C 9/18* (2006.01)

(52) U.S. Cl.
  CPC .. *F02C 7/047* (2013.01); *F02C 6/08* (2013.01)
  USPC .............................. 60/39.093; 60/782; 60/806

(58) Field of Classification Search
  CPC ............... F02C 6/08; F02C 7/047; F02C 9/18
  USPC ................... 60/782, 785, 39.093, 806, 39.83; 137/15.1, 15.2; 244/134 R, 134 B, 134 C
  See application file for complete search history.

(56) References Cited

U.S. PATENT DOCUMENTS

| | | | | |
|---|---|---|---|---|
| 2,594,118 A | * | 4/1952 | Boyd | 244/134 R |
| 2,749,087 A | * | 6/1956 | Blackman et al. | 60/39.08 |
| 3,123,283 A | * | 3/1964 | Leis | 415/115 |
| 3,919,837 A | | 11/1975 | Pradt | |
| 4,552,579 A | | 11/1985 | Blumenfeld et al. | |
| 5,560,195 A | | 10/1996 | Anderson et al. | |
| 5,763,876 A | | 6/1998 | Pertinarides et al. | |
| 5,988,283 A | | 11/1999 | Gann | |
| 6,027,304 A | | 2/2000 | Arar et al. | |
| 6,226,974 B1 | | 5/2001 | Andrew et al. | |
| 6,851,303 B2 | * | 2/2005 | Parfitt et al. | 73/112.01 |
| 7,202,447 B2 | | 4/2007 | Kingdon et al. | |
| 7,841,186 B2 | | 11/2010 | So et al. | |
| 2010/0107594 A1 | * | 5/2010 | Coffinberry et al. | 60/39.093 |

* cited by examiner

*Primary Examiner* — Andrew Nguyen
(74) *Attorney, Agent, or Firm* — Hoffman Warnick LLC; Ernest G. Cusick

(57) ABSTRACT

A gas turbine inlet heating system is disclosed. In one embodiment, the system includes: a compressor having: an inlet bellmouth adjacent to a set of inlet guide vanes (IGVs); and an outlet fluidly connected to the inlet bellmouth; and a conduit coupled to an outlet of the compressor, the conduit including a control valve, the conduit for diverting a first portion of compressed air from the outlet of the compressor to the inlet bellmouth.

2 Claims, 1 Drawing Sheet

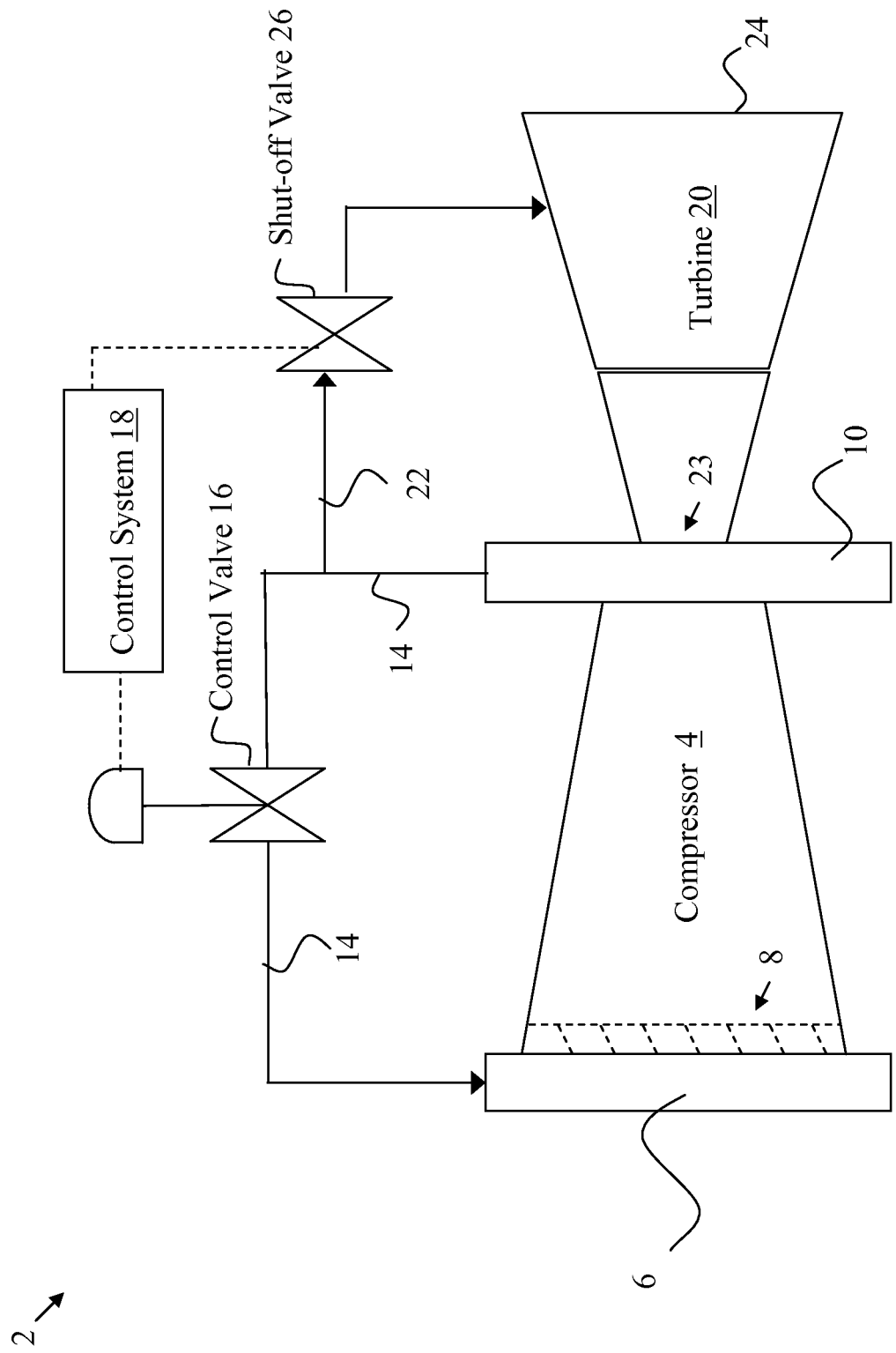

GAS TURBINE INLET HEATING SYSTEM

BACKGROUND OF THE INVENTION

The subject matter disclosed herein relates to a gas turbine inlet heating system. Specifically, the subject matter disclosed herein relates to a system for extracting air from a compressor discharge section to heat a portion of a gas turbine inlet.

Conventional gas turbine power systems employ a myriad of pipes and conduits to heat high pressure inlet bleed air. More particularly, conventional gas turbine systems divert heated compressed air from a compressor extraction discharge manifold, via a line, to an inlet duct of the compressor. The flow of the diverted heated compressed air from the compressor is controlled by an isolation valve and a control valve. After passing the control valve, the diverted air then flows through an array of heater tubes and eventually to the inlet guide vanes (IGVs) of the compressor for recycling through the compressor and potential use in an adjoining gas turbine. The distance that the diverted compressed air is required to travel before reaching the IGVs of the compressor can result in performance losses, and the hardware (e.g., piping, conduits, etc.) required to transport this diverted air can be costly.

Other conventional gas turbine systems (e.g., an aircraft engine) can include less piping than in the conventional power system (described above), however these systems provide little control over the flow of diverted air. That is, these systems traditionally have merely a simple "on/off" switch, that either provides diverted compressor air, or does not, according to the position of the switch. In this case, the engine controller simply flips a switch allowing for a large portion of heated compressor air to be diverted away from the turbine and to the compressor inlet. This can cause a significant decrease in the output of the turbine, and cause system inefficiencies. Additionally, the amount of air delivered to the compressor inlet is fixed and subject to the size of the on/off valve.

BRIEF DESCRIPTION OF THE INVENTION

A gas turbine inlet heating system is disclosed. In one embodiment, the system includes: a compressor having: an inlet bellmouth adjacent to a set of inlet guide vanes (IGVs); and an outlet fluidly connected to the inlet bellmouth; and a conduit coupled to an outlet of the compressor, the conduit including a control valve, the conduit for diverting a first portion of compressed air from the outlet of the compressor to the inlet bellmouth.

A first aspect of the invention includes a system having: a compressor including: an inlet bellmouth adjacent to a set of inlet guide vanes (IGVs); and an outlet fluidly connected to the inlet bellmouth; and a conduit coupled to an outlet of the compressor, the conduit including a control valve, the conduit for diverting a first portion of compressed air from the outlet of the compressor to the inlet bellmouth.

A second aspect of the invention includes a gas turbine system having: a turbine; a compressor coupled to the turbine at an outlet of the compressor, the compressor including: an inlet bellmouth adjacent to a set of inlet guide vanes (IGVs); and an outlet fluidly connected to the inlet bellmouth; and a conduit coupled to the outlet of the compressor, the conduit including a control valve, the conduit for diverting a first portion of compressed air from the outlet of the compressor to the inlet bellmouth.

A third aspect of the invention includes a gas turbine system having: a turbine; a compressor coupled to the turbine at an outlet of the compressor, the compressor including: an inlet bellmouth adjacent to a set of inlet guide vanes (IGVs); and an outlet fluidly connected to the inlet bellmouth; a conduit coupled to the outlet of the compressor and the inlet bellmouth, the conduit including a control valve; and a control system configured to instruct the control valve to provide a first portion of compressed air from the outlet of the compressor to the inlet bellmouth.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 1 shows a schematic view of a system according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide for a gas turbine inlet heating system. Specifically, the subject matter disclosed herein relates to system for extracting air from a compressor discharge section to heat a portion of a gas turbine inlet.

As noted herein, two conventional systems have been employed for diverting heated compressed air from a compressor for the purposes of heating that compressor's inlet air. The first conventional system is the gas turbine power system. This system employs a myriad of pipes and conduits to heat high pressure inlet bleed air. More particularly, conventional gas turbine systems divert heated compressed air from a compressor extraction discharge manifold, via a line, to an inlet duct of the compressor. The flow of the diverted heated compressed air from the compressor is controlled by an isolation valve and a control valve. After passing the control valve, the diverted air then flows through heater tubes and eventually to the inlet guide vanes (IGVs) of the compressor for recycling through the compressor and potential use in an adjoining gas turbine. The distance that the diverted compressed air is required to travel before reaching the IGVs of the compressor can result in performance losses, and the hardware (e.g., piping, conduits, etc.) required to transport this diverted air can be costly.

The second conventional system is the engine (e.g., an aircraft engine). The aircraft engine includes less piping than in the conventional power system (described above), and utilizes the diverted heated compressor air for the purposes of anti-icing (e.g., on a cold day). While this conventional system does feed diverted compressor air back to the compressor inlet with less hardware (e.g., piping), it provides little control over the flow of diverted air. That is, the aircraft engine is designed with a simple "on/off" switch, that either provides diverted heated compressor air, or does not, according to the position of the switch. In this case, the engine controller (e.g., an aircraft pilot) simply flips a switch allowing for a large portion of heated compressor air to be diverted away from the turbine and to the compressor inlet. This can cause a significant decrease in the output of the turbine, and cause system inefficiencies. Additionally, the amount of air delivered to the compressor inlet is fixed and subject to the size of the on/off vale size.

In contrast to the conventional systems described herein, aspects of the invention provide for a gas turbine inlet heating system having: a compressor including: an inlet bellmouth adjacent to a set of inlet guide vanes (IGVs) and an outlet fluidly connected to the inlet bellmouth; and a conduit including a control valve, the conduit for diverting a portion of compressed air from the outlet of the compressor to the inlet bellmouth.

Turning to FIG. 1, a schematic view of a system (e.g., a gas turbine inlet heating system) 2 is disclosed including a compressor 4 having an inlet bellmouth 6 adjacent to a set of inlet guide vanes (IGVs) 8 (shown in phantom as an internal component within compressor 4). The compressor 4 may further include an outlet 10 (e.g., an outlet manifold) fluidly connected to the inlet bellmouth 6 via a conduit 14, as described further herein. As shown, the conduit 14 can be coupled to the outlet 10 of the compressor 4. The conduit 14 can include a control valve 16, which is described further herein with respect to a control system 18 and control processes according to embodiments of the invention. In embodiments of the invention, the conduit 14 is for diverting a first portion of compressed air from the outlet 10 of the compressor 4 to the inlet bellmouth 6. That is, in contrast to conventional systems, the system 2 is capable of diverting exhaust compressed air from the outlet 10 of the compressor 4 directly to the IGVs 8, via the inlet bellmouth 6 (or, manifold). These conventional systems do not have the inlet bellmouth 6 as shown and described with reference to FIG. 1.

The system 2 can further include a control system 18 operably connected to the control valve 16. The control system 18 and control valve 16 can take any conventional forms capable of controlling the flow of fluid (e.g., air) through the conduit 14 (which may be a conventional conduit for carrying fluid). For example, where control valve 16 is a mechanically controlled valve, the control system 18 may include mechanical components for opening and closing the control valve 16. Where the control valve 16 is configured to be controlled electronically (e.g., via electrical switches), the control system 18 can be an at least partially electrical system. In some cases, the control system 18 and/or control valve 16 can be electro-mechanical devices. In some embodiments, the control system 18 and/or control valve 16 can be at least partially software controlled. In any case, the control system 18 can be configured to provide instructions to the control valve 16 for providing a portion of the compressed air from the outlet 10 to the inlet bellmouth 6.

The control system 18 can be further configured to monitor parameters of the turbine 20 and/or compressor 4 to determine an amount of air to be diverted via the conduit 14 (and/or bypass conduit 22). That is, the control system 18 may monitor temperature, flow rates, volumes, output, shaft speeds, etc. of one or more of the turbine 20 and/or compressor 4 to determine an amount of air to be diverted through conduit 14 and provided to inlet bellmouth 6. Further, the control system 18 may include or be operably connected with, a temperature sensor for determining an ambient temperature proximate to the compressor 4 and/or the turbine 20. This may allow the control system 18 to determine, e.g., whether anti-icing conditions are in effect.

The inlet bellmouth 6 may be designed to receive compressed air exhaust from the outlet 10 directly from the conduit 14. In some embodiments, the inlet bellmouth 6 may have an inner diameter of approximately 38 inches to approximately 66 inches. In other embodiments, the inlet bellmouth 6 may have an inner diameter of approximately 70 inches to approximately 95 inches.

As shown, the compressor 4 can be coupled to a gas turbine 20, which may be a conventional gas turbine used for converting the motion of a gas across turbine blades within the turbine 20 into rotational motion in the turbine's shaft. In some embodiments, the gas turbine 20 is configured to receive a second portion of compressed air from the outlet 10 of the compressor 4 via a second, or bypass conduit 22. As shown, the bypass conduit 22 can be connected with the first conduit 14 upstream of the control valve 16. That is, the bypass conduit 22 is connected to the first conduit 14 at a location closer to the outlet 10 of the compressor 4 than the location of the control valve 16 within the first conduit 14. The bypass conduit 22 is configured to receive a distinct portion of exhaust from the compressor 4 than the portion provided to the compressor's inlet bellmouth 6. In some cases, the bypass conduit 22 is configured to supply bypass compressed air from the outlet 10 of the compressor 4 to a stage of the gas turbine 20, between the turbine's inlet 23 and its outlet 24. That is, the bypass conduit 22 is configured to supply bypass compressed air to a portion of the gas turbine downstream of the turbine inlet 23, in a lower-pressure section of the gas turbine 20. The flow of compressed air through the bypass conduit 22 can be controlled by a shut-off valve 26 (e.g., via the control system 18, or optionally, independently). As will be understood by those having skill in the art, the amount of compressed air extracted from the outlet 10 of the compressor 4 and provided to the inlet bellmouth 6 may be a function of the position of the control valve 16, compressor IGV's (8) angle position, and the compressor measured pressure ratio. The shut-off valve 26, together with control valve (16) can be controlled by the control system 18.

In contrast to conventional systems, aspects of the invention provide a control system 18 for actively controlling the control valve 16 (and/or the shut-off valve 26) to provide a predetermined portion of compressed air from the compressor outlet 10 to the IGVs 8, thereby allowing for heating of the compressor inlet bellmouth 6. This may allow for, among other things, anti-icing of the area around the compressor inlet bellmouth 6. As the configuration disclosed in the system herein delivers compressed air directly to the IGVs, the compressor inlet bellmouth 6 is designed to receive higher-pressure, higher temperature compressed air than in conventional systems. In some cases, this can require the compressor inlet bellmouth 6 to include a built-up, or reinforced portion configured to receive higher-pressure, higher-temperature compressed air. By definition, the inlet bellmouth 6 can include a flared-out or bell-shaped section having a greater inlet diameter than a portion of the compressor 4 surrounding the IGVs 8. That is, the inlet bellmouth 6 may have an inner diameter of such dimension that it can receive the higher-pressure compressed air from the conduit 14. In some cases, the inlet bellmouth 6 may take a conventional manifold shape, which includes sections or steps that progressively narrow upon axial approach to the IGVs 8 from the inlet. In contrast to conventional compressor inlets, the inlet bellmouth 6 can include several steps or sections along its inner surface for receiving air from the conduit 14.

The system 2 shown and described herein can provide for performance gains in at least the following scenarios: a) Turn-down operation, where the output of the turbine is being intentionally reduced; b) Anti-icing, where the ambient temperature conditions are cold enough to warrant heating of the compressor inlet (or, compressor skin); and c) Surge control, where unwanted variations in turbine output are being regulated. As compared to conventional power generation systems, the system 2 shown and described herein can provide for a reduction in hardware components (e.g., additional piping, valves, etc.) while maintaining performance goals of the system. Further, as compared to conventional engine systems (e.g., aircraft engines) aspects of the invention allow for control of an amount of extracted compressed air (via control system 18) from the compressor outlet 10, which may allow for improved performance as compared to those conventional engine systems.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    a compressor including:
       an inlet bellmouth adjacent to a set of inlet guide vanes (IGVs),
       wherein the inlet bellmouth has an inner diameter of approximately 70 inches to approximately 95 inches; and
    an outlet fluidly connected to the inlet bellmouth;
    a first conduit coupled to the outlet of the compressor, the first conduit including a control valve, the first conduit for diverting a first portion of compressed air from the outlet of the compressor to the inlet bellmouth adjacent the set of IGVs;
    a gas turbine coupled to the compressor, wherein the gas turbine is configured to receive a second portion of compressed air distinct from the first portion from the outlet of the compressor;
    a bypass conduit fluidly connected with the first conduit upstream of the control valve, the bypass conduit including a shut-off valve, wherein the bypass conduit is configured to supply the second portion of the compressed air from the outlet of the compressor to a stage of the gas turbine downstream of an inlet of the gas turbine; and
    a control system operably connected to the control valve and the shut-off valve, the control system configured to monitor parameters of at least one of the gas turbine or the compressor and provide instructions to the control valve for providing the first portion of the compressed air from the outlet to the inlet and the shut-off valve for providing the second portion of the compressed air from the outlet of the compressor to the stage of the gas turbine, wherein the control system determines an amount of compressed air provided in the first portion to the inlet bellmouth based upon a position of the control valve, an angle position of the IGVs and a measured pressure ratio in the compressor.

2. The system of claim 1, wherein the control system includes a temperature sensor for determining an ambient temperature proximate at least one of the compressor or the turbine.

\* \* \* \* \*